United States Patent [19]

Florent

[11] Patent Number: 5,418,830
[45] Date of Patent: May 23, 1995

[54] RADIOMETRIC THICKNESS MEASUREMENT GAGE

[75] Inventor: Jean-Jacques Florent, Saint Germain De Joux, France

[73] Assignee: Scan-Tech S.A., Le Bourget Du Lac, France

[21] Appl. No.: 57,810

[22] Filed: May 7, 1993

[30] Foreign Application Priority Data

May 15, 1992 [FR] France .................. 92 06156

[51] Int. Cl.⁶ .............................................. G01B 15/02
[52] U.S. Cl. ........................................ 378/89; 378/54; 378/90
[58] Field of Search ................ 378/51, 53, 54, 55, 378/56, 86, 88, 89, 140, 161

[56] References Cited

U.S. PATENT DOCUMENTS

| | | | |
|---|---|---|---|
| 3,617,788 | 11/1971 | Goorissen et al. | 378/140 |
| 4,095,106 | 6/1978 | Wallace | 378/54 |
| 4,228,351 | 10/1980 | Snow et al. | 378/54 |
| 4,510,577 | 4/1985 | Tsujii et al. | 378/54 X |

FOREIGN PATENT DOCUMENTS

| | | |
|---|---|---|
| 923989 | 4/1963 | United Kingdom . |
| 962990 | 7/1964 | United Kingdom . |
| 1010071 | 11/1965 | United Kingdom . |
| 1494549 | 12/1977 | United Kingdom . |

OTHER PUBLICATIONS

"On Line Non-Contact Thickness Measurement of Flat Rolled Materials", *Conf. Record of 1989 IEEE Industry Aplns. Society Annual Mtg. Part II*, Mitchell, 1989, pp. 1481–1486.

H. Semat, "Introduction to Atomic and Nuclear Physics", published 1962, Chapman and Hall, see pp. 157–161.

*Primary Examiner*—David P. Porta
*Attorney, Agent, or Firm*—Oliff & Berridge

[57] ABSTRACT

Radiometric gage for contactless measurement of the surface density or the thickness of a flat product, includes:
  an X-radiation emitter, whose tube, is directed toward the flat product
  an X-radiation receiver, whose detector is disposed in order to receive X-radiation scattered or transmitted in attenuated form through said flat product, said receiver delivering a measurement signal
  a member for processing the measurement signal, in order to obtain information representing the surface density or the thickness of the flat product The anticathode of the tube is made of a material with atomic number as high as possible, preferably greater than 70, which is a good conductor of heat and has a high melting point. A member for adjusting the voltage (V) between the cathode and the anticathode is designed to operate in a predetermined range of relatively low voltages, in order to obtain, in conjunction with the anticathode, an X-ray emission spectrum essentially limited to continuous bremmstrahlung whose maximum energy is fixed by the value of the voltage (V) between cathode and anticathode.

19 Claims, 6 Drawing Sheets

RADIOMETRIC THICKNESS MEASUREMENT GAGE

The present invention relates to radiometric gages for contactless measurement of the surface density or thickness of a flat product.

BACKGROUND OF THE INVENTION

"Flat product" is taken to mean any product, any material, or any object, whether solid, pasty or viscous, having one dimension called the thickness which is substantially less than the other two dimensions called the length and width. Preferably, but not exclusively, the flat products which the invention concerns are strips or sheets, in which the length exceeds the width, are continuous or discontinuous, moving or stationary, such as encountered in various industrial processes, and whose surface density or G.S.M., or the thickness for the same volume density is to be measured without contact.

By way of example, and non-limitingly, a flat product according to the invention may be:
  a metal plate, sheet or thin sheet, such as encountered in metallurgy or metalworking
  a plastic film, of varying thickness, but often of relatively small thickness, for example approximately 10 microns
  a coating, with for example the support constituting fitted floor coverings
  a sheet of rubber
  a sheet of paper
  a fabric
  a pane of glass
  a board or panel of compressed wood particles.

In the sense of the present invention, a flat product may also be a layer of a given material, deposited on a flat support, and whose surface density or thickness it is desired to measure as before.

In general, contactless radiometric gages comprise:
  an emitter of an electromagnetic radiation or of a particle beam, whose source, situated on one side of the flat product to be measured, is directed toward the latter
  a receiver of the radiation or the beam, whose detector is situated with respect to the flat product to be measured, and in relation with the source, in order to receive a radiation or beam scattered or transmitted through said product, in attenuated form; this detector delivers a measurement signal
  optionally a mechanical support making it possible to support, and optionally to move the sensor or emitter/receiver assembly, with respect to the flat product being measured
  an analog and/or computerized member for processing the measurement signal, in order to obtain information representing the surface density or thickness of the flat product.

The variations in the measurement signal are a function of the quantity of particles or photons detected per unit time, and the energy given up by said particles or said photons. The variations in the attenuation of the incident flux, corresponding to the transmitted or reflected flux, are correlated with variations in the thickness or G.S.M. of the flat product, and consequently the measurement signal makes it possible to measure the thickness or G.S.M. of said flat product.

Two types of gage have been proposed, and correspond to the preceding definition:
  the first, working in transmission, comprise a receiver whose detector is disposed on the other side of the flat product to be measured, with respect to the source, in order to receive the attenuated radiation transmitted through the flat product
  the second, working in back-scattering, comprise a receiver whose detector is disposed on the same side as the source, with respect to the flat product to be measured, in order to receive the attenuated radiation reflected by the flat product.

Back-scatter gages are predominantly used for measuring the thickness of a layer deposited on a support, or the thickness of a flat product which is only accessible on one face, for example for manufacturing reasons.

DESCRIPTION OF THE PRIOR ART

For radiometric measurements, two types of emitter have hitherto been proposed or described, namely:
  emitters of an "X" or "$\gamma$" photon radiation, therefore with a wavelength generally lying between $5 \times 10^{-4}$ and 5 nm
  and emitters of a so-called $\beta$ (positive or negative electrons), or $\alpha$ (helium nuclei) particle radiation.

One of the principle constraints of radiation gages relates to the precision of the measurement.

Various factors detrimentally affect the latter, but in current usage, the principal source of imprecision is due to statistical fluctuations in the emitted radiation. Since the particles of photons are emitted randomly, the quantity of radiation emitted per unit time can therefore vary.

The imprecision due to the statistical fluctuations is dependent on the thickness of the flat product, on the nature and the respective proportions of the constituent atoms of the flat product, as well as on the nature of the radiation used, and finally on the rate of emission by the source and the time devoted to the measurement:
  the measurement time and the emission rate of the source are two linked quantities; if N is the mean number of particles emitted per unit time, and T the measurement time, the total quantity of particles emitted per unit time is NT; since the emission of a particle is of "all or nothing" nature, the standard deviation at this mean is calculated from a binomial law, and is therefore equal to $\sqrt{NT}$; the precision of the measurement is therefore a function of this parameter $\sqrt{NT}$
  the other parameters-thickness of the flat product, nature of the flat product, nature of the emitter—affect the precision of the measurement, by virtue of the ability of the flat product to absorb the incident flux.

As regards the thickness, if this is small, the radiation passes through the flat product practically without "seeing" it, by virtue of which the transmitted flux is still very close to the incident flux, and the result of this is a measurement signal which poorly represents the thickness of the flat product. In contrast, at high thicknesses, the radiation is practically stopped and absorbed in the flat product, by virtue of which the radiation scattered or transmitted is too weak to obtain a measurement signal indicating the thickness of the flat product. In both cases, the precision is very poor.

As regards the nature of the emitter, if the particles or photons have excessive penetrating power, their probability of interaction in the flat product is negligible. In this case as well, the incident flux and the transmitted flux may be very close. In contrast, if the particles or photons have very low penetrating power, the transmitted flux is a negligible fraction of the incident flux.

As regards the nature of the flat product, the probability of interaction depends on the nature of the constituents of the flat product. For example, X-rays are very sensitive to this composition. At constant thickness, and for the same X-rays, it is possible to have a probability of interaction which is practically negligible, or conversely practically certain, depending on the nature of the flat product. Here again, the precision will be very poor in both cases.

In conclusion, if the nature and the mean thickness of the flat product are known, good precision is obtained by suitably choosing the type of emitter and its energy, and making the best compromise, on the one hand, between the highest radiation emission intensity and the cost of the radiation source, and on the other hand, between the longest possible measurement time and the requirements for speed in the measurement, these being necessary for example for correct regulation.

The following table gives the precision of the measurement, taking into account the statistical fluctuations, in a few typical cases (the incident flux is $10^7$ X-ray photons per second, and the measurement time is 10 ms).

| Nature | X-ray:energy (keV) | Thickness (μm) | Precision (%) |
|---|---|---|---|
| Polypropylene | 4 | 5 | 9 |
| | | 100 | 1.1 |
| | | 500 | 0.53 |
| | 10 | 5 | (negligible absorption) |
| | | 100 | 8.1 |
| | | 500 | 1.75 |
| Aluminum | 4 | 5 | 0.83 |
| | | 100 | (flux completely absorbed) |
| | | 500 | (flux completely absorbed) |
| | 10 | 5 | 9.4 |
| | | 10 | 0.65 |
| | | 500 | 0.511 |

Radiation or X-ray gages are obtained from radioisotope sources. In view of the variety of available sources, it seems possible to choose the radioisotope as a function of the nature and/or the thickness of the flat product to be measured, in order to obtain, according to the above principles, a measurement signal actually representing its surface density or its thickness. However, there is often a large deficiency with respect to the optimum precision which could theoretically be achieved. The appropriate match of flat product to be measured/radioisotope source is rarely optimal. This stems from the fact that relatively few isotopes can be used. In fact, although their potential number is several hundred and the range of available energies is vast, several constraints drastically limit the number of isotopes adopted in practice:

the lifetime, represented by the radioactive half-life; a relatively long half-life is necessary for an industrial application (at least one year); a very large number of radioisotopes have half-lives ranging from a few milliseconds to a few minutes, hours or days it is necessary to be able to find the sources in the form of a sealed radioisotope source the activity of the source must be sufficient; sources of a few MBq are unusable, for example.

All these constraints reduces the number of radioisotopes used in radioisotope gages to about ten. Thus, the following uses are currently known:

| Radioisotope Source | Radiation Type | Energy* | Flat product (for example) |
|---|---|---|---|
| Promethium-147 | β | 0.23 MeV | Thin plastics typically of 5 to 130 μm |
| Krypton-85 | β | 0.67 MeV | Thicker plastics 0–1200 g/m² |
| Iron-55 | X | 5.9 keV | Magnetic oxide on polyester (0–50μ) aluminum sheet (0–100μ) |
| Strontium-90 | β | 2.2 MeV | Thick plastics 200–7000 g/m² |
| Curium-144 | X | 15/19/22 keV | Thin metal sheets, for example aluminum (0–5 mm) |
| Americium-241 | X | 60 keV | Steel sheets (0.5 mm) rubber |
| Caesium-137 | γ | 661 keV | Thick metal sheets |
| Cobalt-60 | γ | 1.17/1.33 MeV | Very thick metal sheets |

(*)for β-rays, the maximum energy of the emission spectrum is given.

When a flat product with relatively low thickness is involved, for example a plastic sheet of about ten microns, only low-energy β sources can be used from the radioisotope sources. In fact, an acceptable precision can be achieved only by using promethium-147, the β-rays from krypton-85 for example having already too high a penetrating power for this type of application. The same thing is true for X-rays from iron-55, whose energy is 5.9 keV, and which are rays with much too a high a penetrating power for the measurement of thin plastics. The only X-ray source which might allow precise measurement is calcium-40 (of the order of 4 keV), but it can only be found with activities which are much too small.

However, the use of promethium-147 has several drawbacks which should be explained.

First of all, β particles with relatively low energy are sensitive to the air column existing between the source and the plastic sheet, and to the one existing between the latter and the detector, by virtue of the fact that these same particles lose a proportion of their energy in air. In particular, with the emission spectrum of the β-rays being continuous—ranging from zero energy to a maximum energy—and the maximum in the distribution being situated at approximately one third of the maximum energy, an air column has the effect of stopping all the β-rays of small energy in the low end of the spectrum. Consequently, the measurement signal seems to be sensitive to the variations in density of the air, and therefore to its variations in temperature. Such a sensitivity is not negligible, in a production environment, such as may exist in furnaces, or in contrast, for various cooling systems, in proximity to the thickness measurement gage.

Next, the measurement range seems relatively limited, in this case from 5 to 130 μm, which prevents any standardization of measurement gages, for a wider measurement range.

Furthermore, β particles of low energy are scattered and dispersed relatively strongly in air. Thus, even if the distance between the source and the detector remains relatively low, for example of the order of 2 to 3 cm diameter, and even with a well-collimated source (0.5 cm diameter for example), the detector receives an attenuated flux having a cross section or "spot", of 4 to 5 cm diameter, which prevents a better spatial resolution than these last values. Now, for many continuous industrial processes where thickness measurement is used for regulating purposes, the measurements must be performed at much shorter intervals, for example of the order of 2.5 cm. This constitutes a significant limitation on the use of β sources.

It should also be noted that the scattering and dispersion of β-rays, during their passage through air and the material, also degrades the precision of the measurement. Just as the emission statistical fluctuations of the β-rays are, as before, a source of imprecision, there is also a statistical error coming from the random nature of the interaction processes of the β-rays:
 the energy loss of a β-ray for a given path is distributed around a mean value
 there is a very high dispersion in the paths of the β-radiation coming from the source, which has strong repercussions on the energy loss
 the angular dispersion of the β-radiation also leads to the number of β-rays entering the detector also being random, with a dispersion around the mean which is absolutely non-negligible.

It should finally be noted that, even if it is possible to obtain promethium sources with consistent activity (up to 0.5 Ci), these are in the end activities which are still too small, in view of the statistical effects discussed previously, in particular for flat products with relatively low thickness, such as a sheet of plastic of about 10 microns.

In fact, as previously indicated, and this is true both for an X-ray photon source and a β particle source, the more the response time is relatively short, the more the activity of the source, that is to say the flux of particles emitted per second, should be high, if it is desired to maintain correct precision, for example less than a few per cent, independently of the thickness of the flat product to be measured.

Now, the typical speed of advance of the plastic sheets is high, and may for example reach linear speeds of the order of 10 m/s, In view of these speeds of advance, the measurement time or response time of the gage should in general less than or equal to 20 ms, in order to obtain good scanning of the moving sheet, and/or make a sufficient number of measurements between two members for regulating the thickness.

By way of example, a promethium source may be considered whose maximum activity is 0.5 Ci, which corresponds to an emitted flux of $1.85 \times 10^{10}$ particles per second. In view of the solid angle of scattering of the particles, of the absorption of these same particles in the air column between source and detector, it is at most only $10^8$ particles which are able to reach the latter. Considering known mathematical relationships, giving the precision of the measurement as a function of the penetrating ability of the particles in question, as regards a given material, of the thickness of said material passed through, of the measurement time, of the number of particles detected per second when said material is not interposed between source and detector, and of the random effect resulting from the interaction of the radiation with the material, it is possible to calculate that under these conditions, it seems impossible to reconcile both a precision less than or equal to a few per cent and a response time less than or equal to 20 ms. This is moreover borne out in the specifications given by the manufacturers of thickness gages to their clients. Typically, the manufacturers give 6% precision at 2 $\sigma$, for a response time of 100 ms, using promethium-147, for a plastic sheet of 5 microns thickness. At 20 ms, this precision falls to 13.5%, and at 10 ms, it is equal to 19%, for the same plastic sheet.

Moreover, and with a more general nature than what has previously been said, the use of a radioactive source brings with it numerous obstacles to "general-purpose" use:
 it is necessary to obtain official authorization for possession of radioactive sources or artificial radioactive isotopes
 the radiation gages must be approved
 they must be used with strict safety and protection conditions
 etc.

Still for the same contactless radiometric measurements, two types of receiver have hitherto been proposed or described, namely:
 those comprising a detector consisting of an ionization chamber
 and those comprising a photomultiplier.

An ionization chamber is a detector without internal gain. Each interaction in the gas of the ionization chamber is manifested by the appearance of a certain number of electron/ion pairs. If the number of interactions is sufficient, the pairs are produced in sufficient numbers to give a measurable electric current.

The principal advantage of the ionization chamber is its great stability as well as its robustness.

On the other hand, it has two drawbacks:
 the ionization chambers must be prepared meticulously; in particular, care must be taken to desorb the metal walls correctly before filling with the suitable gas; this requires handling operations which lead to extra cost;
 the second drawback stems from the fact that the migration of the ions in the gases is relatively slow; this has the consequence of limiting the response time of this type of detector; on the other hand, in the case of very high fluxes, the ions accumulate and the space charges which result therefrom can greatly limit the reliability of the measurement.

A photomultiplier is a detector with internal gain, since a meaningful measurement signal can be obtained from the interaction of a single particle. Because of this, the resultant current is unstable, since the internal gain process is subject to drift and statistical variations.

This problem of stability can be overcome by counting the pulses individually. However, in a very great number of cases, in particular when the flat product is very thin, it proves impossible to perform any counting, because the precision requirements often demand fluxes greater than $10^6$ particles per second. Now, beyond this value, it is very difficult to produce a system allowing reliable counting.

In summary, as a result of this exhaustive technical examination of radiometric gages for contactless measurement of the surface density or the thickness of a flat product, it may be stated that there is currently no technical solution on the market satisfactory for measuring the thickness of a relatively thin plastic sheet, for example of the order of about ten μm, in continuous advance, and that such a situation, which is frequently encountered in industrial production, seems to be the limit on which currently available gages fail.

SUMMARY OF THE INVENTION

The subject of the present invention is therefore a gage as previously described, making it possible to overcome the limitations of current gages, as regards a thin plastic film in continuous advance, whilst not itself being limited to this quite specific application.

In accordance with the present invention, it has first of all been discovered that, for the most difficult case previously elaborated upon, X-radiation could be used, but on condition of substantially modifying its features, with respect to those sometimes used for contactless thickness measurements.

The word "discovered" is indeed appropriate, since it is well known that the attenuation of X-radiation in a material decreases with the atomic number Z of the latter. Since normal plastics have chemical elements with relatively low Z, and especially for some of them (for example polypropylene) a high proportion of hydrogen, it could reasonably be expected that such a plastic would be practically "transparent", to X-radiation, preventing any measurement of its thickness.

A great advantage of the invention is, therefore, that it has shown that by adapting the features of the X-radiation, it could then be used for the most difficult case previously elaborated upon, and in addition for the other normal measurement cases.

And according to the invention, this adaptation consists:

in choosing for the X-radiation emitter, consisting of an X-ray tube, an anticathode which is specific, in the sense that its constituent material is of atomic number Z greater than or equal to 50, and preferably greater than 70, that it furthermore has good thermal conductivity and a high melting point; these constraints, added to the requirement of using a material which is available on the market, limit the possibilities and practice to tungsten (Z=74, thermal conductivity $\rho=1.77$ Wcm$^{-1}$K$^{-1}$, melting point m.p.=3410° C.) and possibly to tantalum (Z=73, $\rho=0.574$ Wcm$^{-1}$K$^{-1}$, m.p.=2996° C.), to rhenium (Z=75, $\rho=0.486$ Wcm$^{-1}$K$^{-1}$, m.p.=3180° C.), to iridium (Z=77, $\rho=1.48$ Wcm$^{-1}$K$^{-1}$, m.p.=2410° C.), to platinum (Z=78, $\rho=0.717$ Wcm$^{-1}$K$^{-1}$, m.p.=1772° C.) and to gold (Z=79, $\rho=3.19$ Wcm$^{-1}$K$^{1}$, m.p.=1064° C.), and in providing a member for adjusting the voltage between the cathode and the anticathode of the X-ray tube, which member is designed to operate in a predetermined range of relatively low voltages (for example lying between 3.7 and 5 kV, in the case of measuring thin plastic sheets, of the order 10 μm), the whole making it possible to obtain an X-ray emission spectrum essentially consisting of bremsstrahlung. The obtained X-ray spectrum is therefore continuous. It is limited, on the high energy side, by the maximum kinetic energy of the electrons striking the target, that is to say by the accelerating voltage between cathode and anti-cathode. Although X-rays with very low energy are also emitted in principle, the spectrum is notable only beyond approximately 2.5 keV. The X-rays of lower energy are stopped either by the anticathode itself, or by the output window of the tube. This spectrum is free from the feature K$\alpha$ or K$\beta$ lines, which are excited only for much higher high voltages (of the order of 70 kV and more, in the case of a tungsten target).

As demonstrated below, such a spectrum makes it possible, on the one hand, to have available bremsstrahlung with sufficient intensity for good precision as regards the measurements envisaged. Moreover, the upper limit of the spectrum can be adapted as a function of the flat product to be measured, and more precisely as a function of the desired attenuation in order to correspond to the optimum precision sought, solely by altering the cathode/anticathode voltage.

DESCRIPTION OF PREFERRED EMBODIMENTS

For example, for very thin plastics, such as polypropylene with a thickness typically less than 300 μm, use would be limited to a high voltage lying between approximately 3.7 and 5 kV. A greater high voltage has the drawback of producing X-rays of energy greater than 5 keV, for which the plastic is practically "transparent". Similarly, a high voltage less than approximately 3.7 kV is unusable, as already mentioned, because of the attenuation in the target, the output window of the tube and the input window of the detector. Furthermore, since the efficiency of production of the bremsstrahlung varies as the square of the high voltage (at constant anode current), the quantity of radiation emitted is substantially insufficient when the high voltage is too low ($\leq 3.7$ kV).

The choice of materials with the highest possible atomic numbers for the anticathode stems from the fact that the efficiency of production of the bremsstrahlung is proportional to the atomic number. A tungsten target produces approximately 2.5 times more radiation than a copper target, and 4 times more than a calcium target, for example.

The constraint of a good thermal conductivity and a high melting point stems from the fact that, depending on the case, 99 to 99.99% of the energy of the accelerated electrons is converted into heat in the anticathode, thus always raising it to a high temperature.

According to another important aspect of the present invention, effectively interacting with the aforementioned features adopted for the radiation, the detector is a vacuum photodiode. The latter comprises, in a manner which is known per se:

a scintillator crystal, for example sodium iodide, converting the energy received after attenuation from the flat product into light a photocathode converting said light into electrons and a vacuum tube with an anode under low voltage (for example 20 volts) for collecting the electrons, by virtue of which an electrical measurement signal of the "current" type is obtained.

Compared to other detectors, such as considered in the preamble of the description, the vacuum diode acts as a photomultiplier, but without internal gain, and therefore in a much more stable manner. Such a detector seems entirely suited to a measurement gage according to the invention, in the sense that it is precise, of relatively small size or bulk, and reacts relatively quickly to a variation in the flux of the X-rays received.

The behaviour of the X-ray emitter/vacuum photodiode pair is studied below, depending on whether the feature emission of an anticathode of low atomic number Z is used, or the bremsstrahlung of a target of high atomic number Z.

Figure 1:
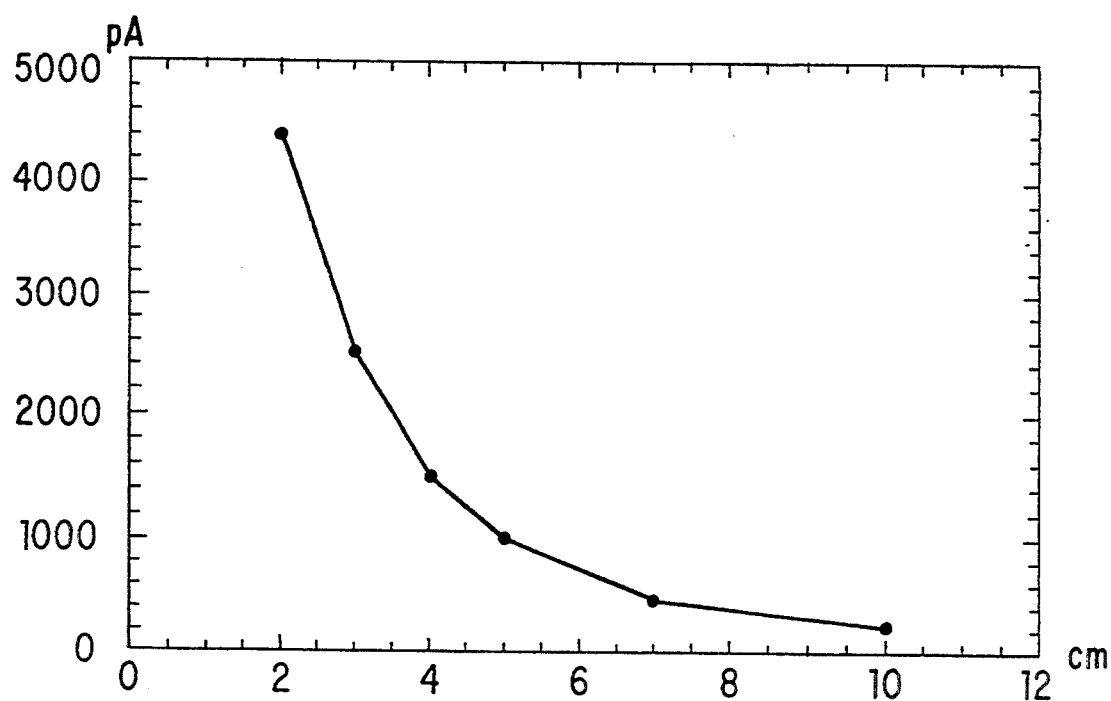
FIG. 1 is a chart showing the relationship between the current detected by a vacuum photodiode and the distance between the photodiode and an X-ray tube.
Figure 2:
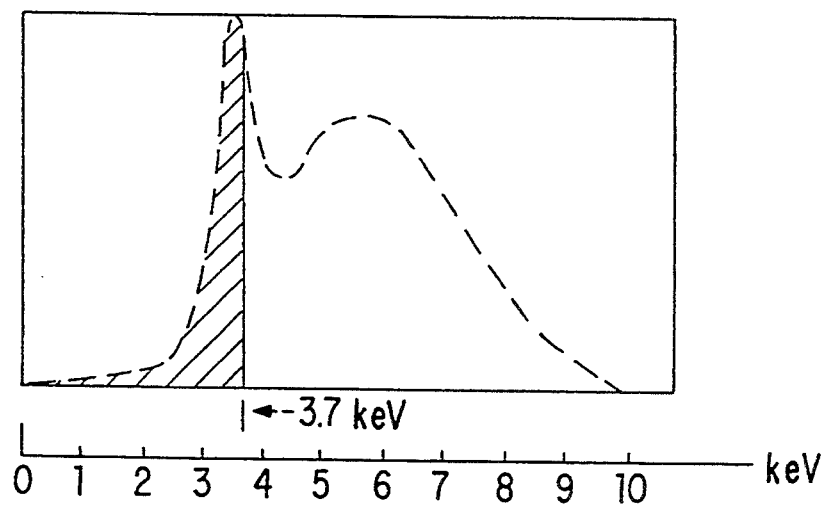
FIG. 2 is a chart showing the energy spectrum of X-rays emitted by an X-ray tube provided with a calcium anticathode.

The use of the feature emission is not very appropriate when the material to be measured is a thin plastic. A feature radiation of very low energy may be envisaged, using anticathodes of atomic number Z close to 20. The X-rays emitted by materials with atomic numbers less than 20 are much too greatly attenuated by the windows of the X-ray tube and of the detector. The result of this is that materials allowing the emission of the softest X-rays compatible with industrial use are calcium (Z=20, K$\alpha$=3.7 KeV) and titanium (Z=22, K$\alpha$=4.5 keV). As regards very thin plastics (<10 $\mu$m) the best choice is obviously a calcium anticathode. This option was the subject of tests which show that although the measurement signal (current) appears to be sufficient (FIG. 1, representing the current of the detector in pA as a function of the distance between the X-ray emitter and the detector, in cm), with a high voltage of 9 kV and for a maximum anode current (here 0.2 mA), the emission spectrum is unfortunately contaminated by a high proportion of bremsstrahlung (FIG. 2 representing the spectrum of the energy, in keV, of the emitted radiation). This bremsstrahlung has too high a penetrating power to participate in the measurement of the thin plastic, but swamps the photodiode with useless information. At lower voltage, for example 5 kV, the attenuation in the plastic is much better, but the current in the photodiode is then much too small ($\sim$25 pA for a distance of 4 cm between tube and detector).

A more powerful X-ray tube than that used for the tests could be envisaged. For electronic processing to be easy, it is necessary to obtain currents in the region of one nanoampere. An X-ray tube would then be necessary allowing anode currents of the order of 5 mA to be achieved. However, to the knowledge of the Applicant, this type of tube, combining both power and calcium target, does not exist in the trade. Neither is such a tube said to be producible, inasmuch as the melting temperature of calcium is only 839° C. In all cases, water cooling would be necessary even for dissipated powers not exceeding about twenty watts.

Figure 3:
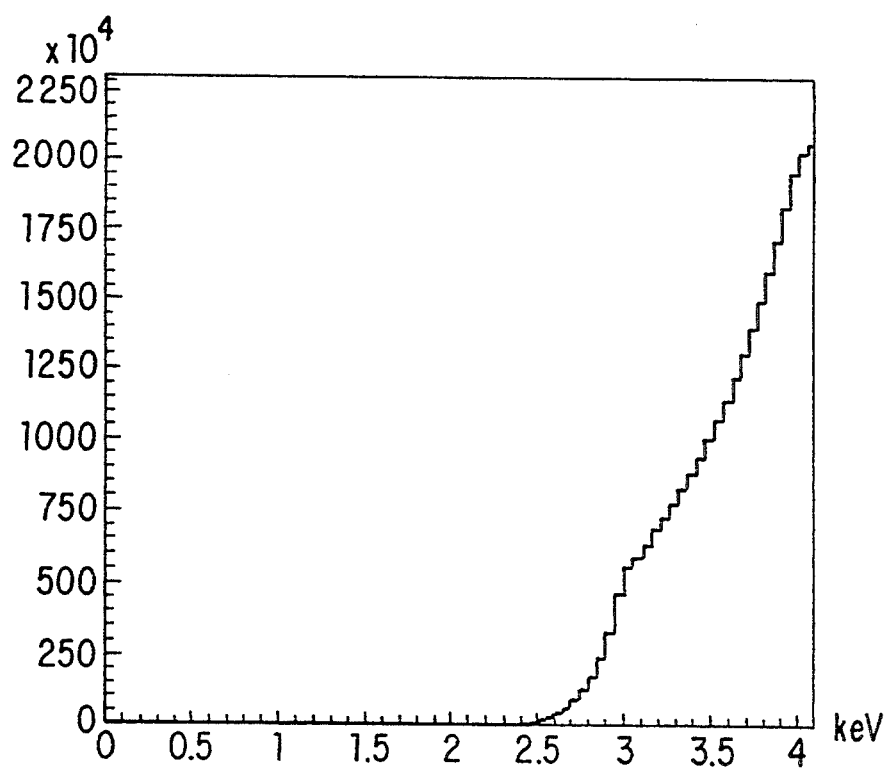
FIG. 3 is a chart showing the energy spectrum of "breaking" X-radiation emitted by an X-ray tube provided with a tungsten anticathode.

The use of the bremsstrahlung according to the invention has also formed the subject of calculations and tests. FIG. 3 (number of X-ray photons as a function of the energy in keV) shows the shape of the calculated spectrum, when the anticathode is made of tungsten with a high voltage of 4.1 kV, and a filament current of 5 mA. The window of the detector is equivalent to 200 $\mu$m of beryllium, and that of the tube consists of 300 $\mu$m of beryllium. The distance between X-ray tube and detector is here 4 centimeters.

Figure 4:
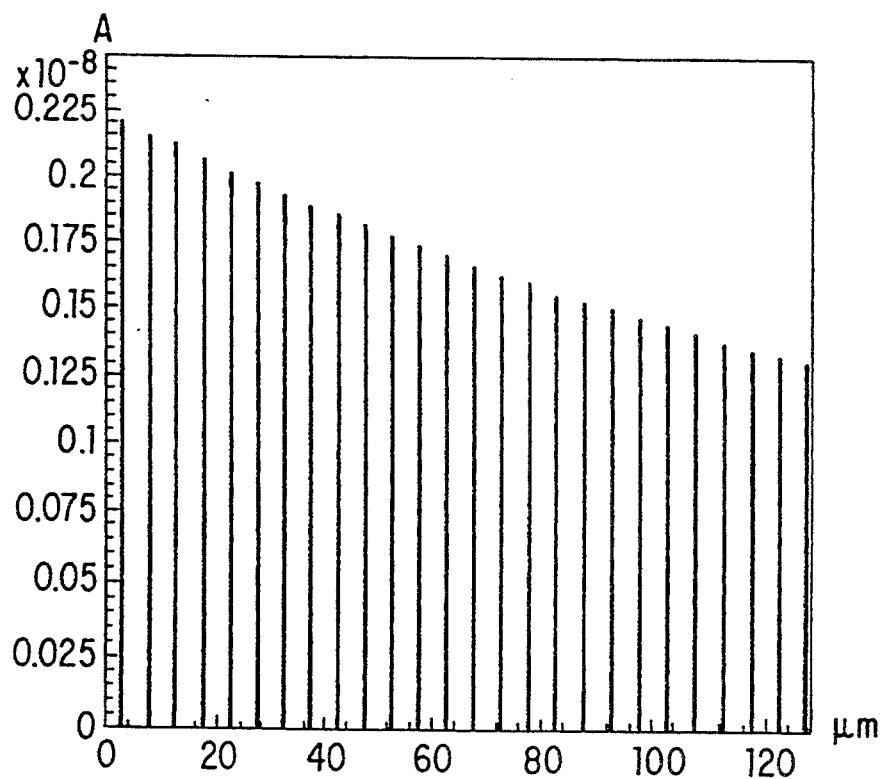
FIG. 4 is a chart showing the relationship between a current detected by a vacuum photodiode and the thickness of a polypropylene sample interposed between the vacuum photodiode and an X-ray tube provided with a tungsten anticathode.
Figure 5:
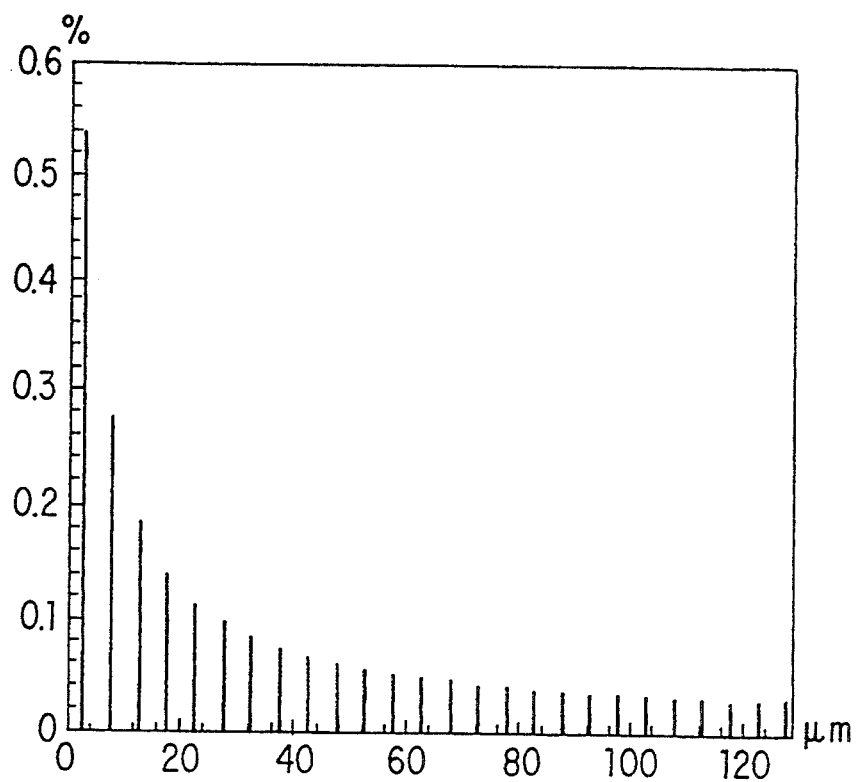
FIG. 5 is a chart showing the statistical accuracy of measurement of the thickness of a polypropylene film obtained with a gage according to the present invention having a vacuum photodiode and an X-ray tube provided with a tungsten anticathode.
Figure 6:
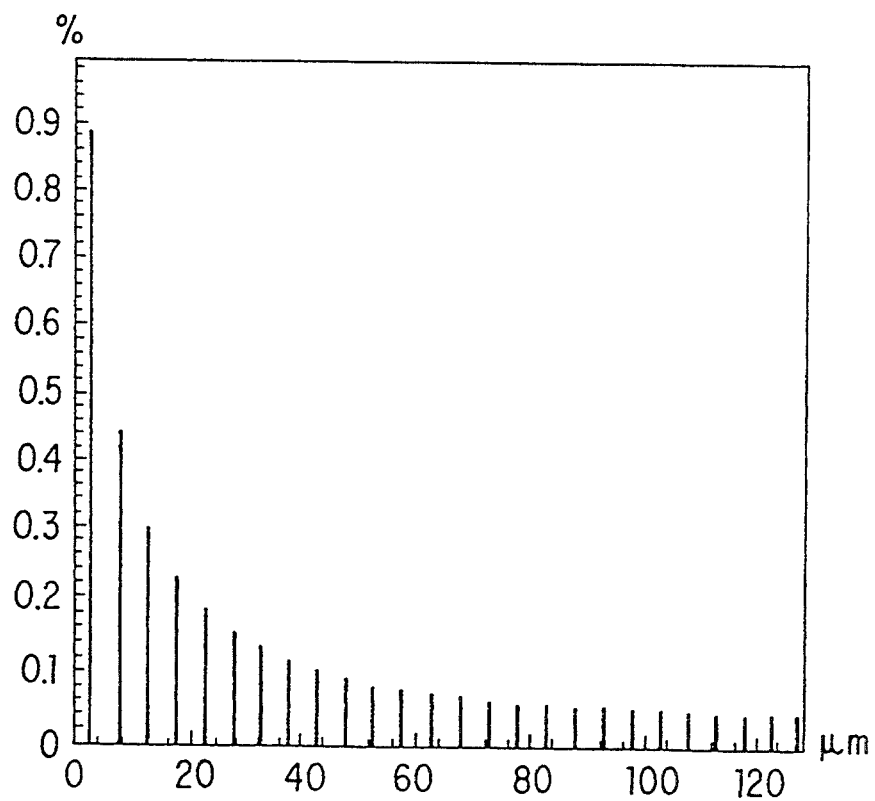
FIG. 6 is a chart showing the error in measurement of the thickness of a polypropylene film using a gage according to the present invention that results from a 1/10,000 change in the acceleration voltage of an X-ray tube provided with a tungsten anticathode.
Figure 7:
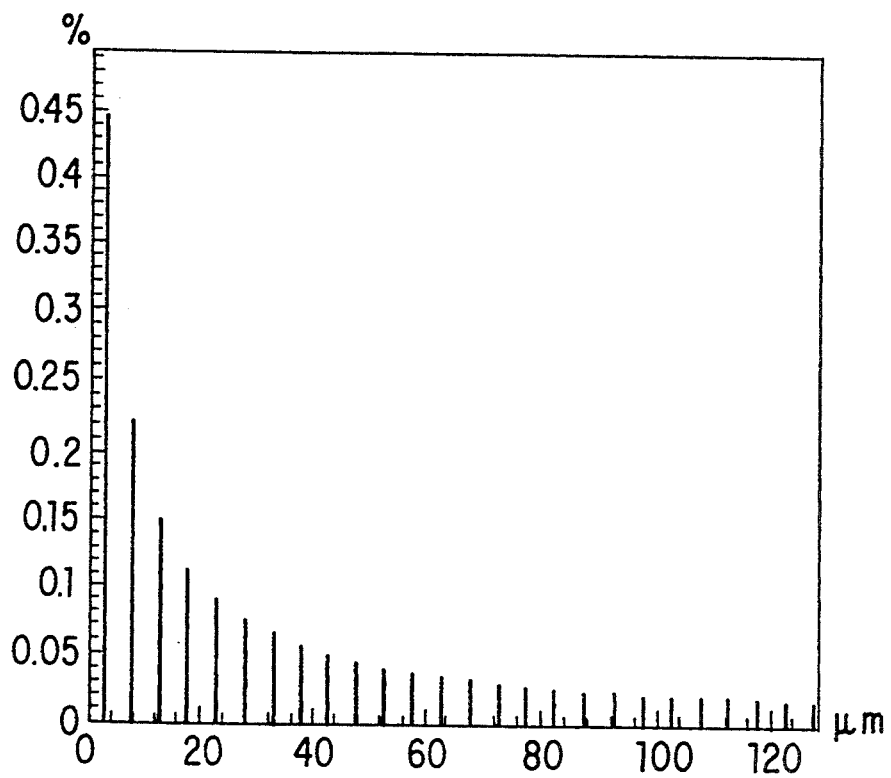
FIG. 7 is a chart showing the error in measurement of the thickness of a polypropylene wire using a gage according to the present invention that results from a 1/10,000 change in the stream of electrons accelerated in an X-ray tube provided with a tungsten anticathode.
Figure 8:
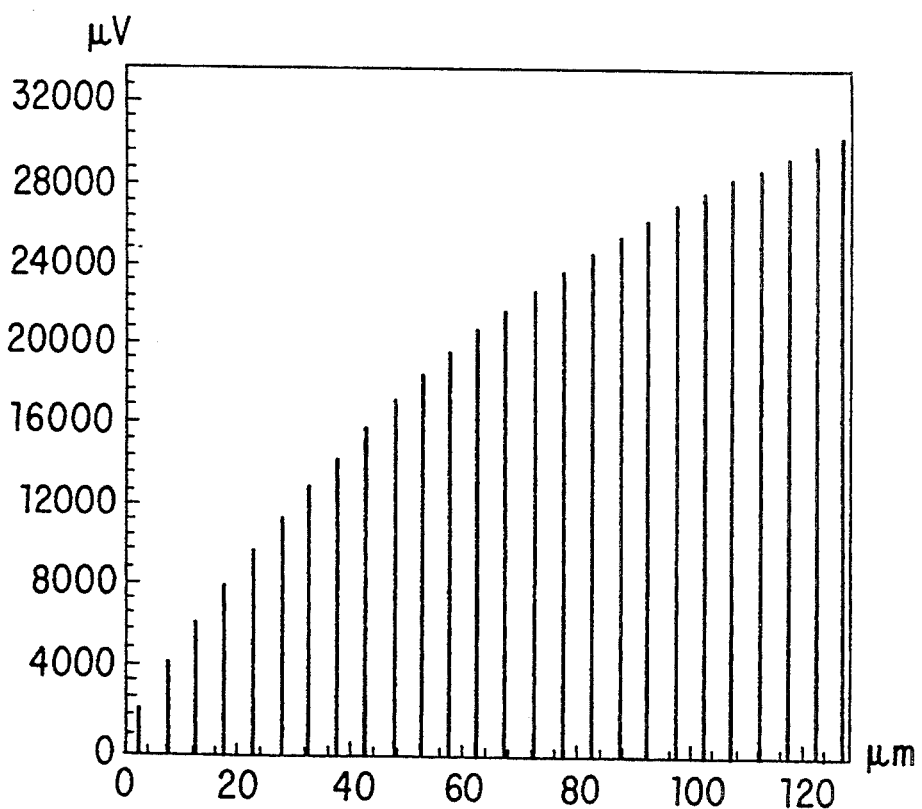
FIG. 8 is a chart showing the variation in the current of a vacuum photodiode of a gage according to the present invention having an X-ray tube provided with a tungsten anticathode that results from varying the thickness of a measured polypropylene film by 1%.

With the same parameters, FIG. 4 shows the current obtained in amperes, as a function of the thickness in $\mu$m of the plastic interposed between emitter and detector (polypropylene). This current is always greater than 1 nA. It therefore allows easy electronic processing. As a function of the thickness of the plastic film in $\mu$m, FIG. 5 shows the statistical precision in percentage at 2$\alpha$. FIGS. 6 and 7 respectively show the effect of a 1/10000 variation in the high voltage of the X-ray tube, and then in the anode current (1/10000 is an entirely realistic regulation level). It is evident that with all the variations taken together, the overall precision of the system is at most a few percent ($\sim$2%). Finally, FIG. 8 shows the variation in the measurement signal (in $\mu$V) obtained, for a 1% variation in thickness, still as a function of the thickness in $\mu$m. The smallest variations (for the thinnest materials) are markedly greater (by an order of magnitude) than the lowest variation detectable by a 14 bit analog/digital converter, and by a greater margin for a 16 bit converter.

All the tests and calculations moreover indicate that the results are increasingly better, the more the X-rays in the low energy part of the bremsstrahlung spectrum participate in the measurement. For this purpose, it is absolutely necessary to reduce the attenuation in the windows of the X-ray tube, and in that of the detector. This is the effect obtained by using a thin beryllium output window, with a thickness not exceeding 400 $\mu$m for the tube, and a composite input window of the detector, which has the property of being absolutely leaktight, in particular, to water, in order to ensure protection of the NaI which is very hygroscopic. The input window does not have a soft X-ray (>2.5 keV and <5 keV) attenuation greater than 400 $\mu$m of beryllium, and it is for example equivalent to 200 $\mu$m of beryllium.

All these results shows that the use of bremsstrahlung emitted by an anticathode with high atomic number (for example tungsten) is perfectly well-suited to the measurement of the thickness of very thin materials, such as plastics with a thickness of about ten μm, on condition of maintaining a high voltage below a suitable value. This is obviously always true for thicker materials.

Figure 9:
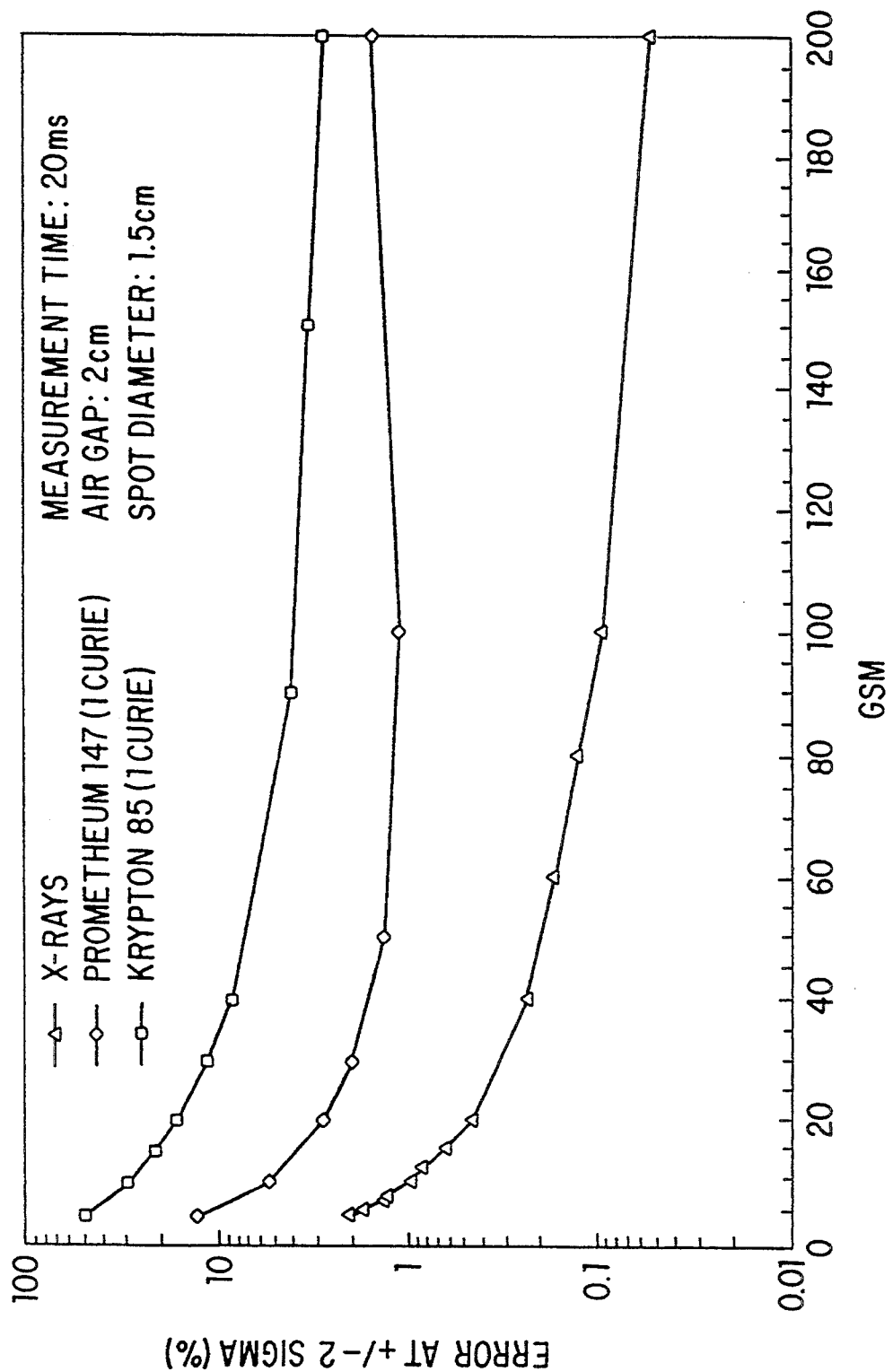
FIG. 9 is a chart comparing the accuracy of thickness measurements between an X-ray gage and a gage provided with a promethium 147 source.

In total, according to the present invention, a measurement gage is obtained which eliminates the principal drawbacks of β-radiation gages:

- when the gage is no longer used, there is no more emission of particles, which considerably simplifies the problems of safety, protection and regulations
- the gage seems insensitive to temperature, since there are practically no X-rays with energy less than 2 keV at the output of the tube, whereas in contrast there are β-rays with practically zero energy at the output of for example a promethium-147 source
- the spatial resolution obtained is of the order of one cm, that is to say an order of magnitude better than conventional systems using an ionization chamber
- the measurement range is very wide, since it is sufficient to increase the high voltage slightly in order to access thicker materials; typically, this system allows precise measurements of the order of one percent for thicknesses ranging from 5 μm to several millimetres, or even more depending on the nature of the material
- the precision of the measurement is much less dependent on the response time, as is the case with conventional systems, since the statistical fluctuations are greatly reduced, but it depends, on the other hand, on the level of stabilization of the supply of the X-ray tube, which can be finely controlled; for very thin plastics, this system allows an order of magnitude to be gained over the typical precisions obtained from promethium-147 sources (see FIG. 9)
- the intrinsic response time of the vacuum photodiode is practically zero, compared to that of an ionization chamber (~0.1 μs compared to several milliseconds).

Finally, with a gage according to the present invention, the precision seems to depend linearly both on the variation in the adjustment voltage between cathode and anticathode, and on the variation in the supply current of the cathode. This linearity makes it possible to correct, if required, the imprecisions generated by the supply variations of the X-ray tube.

Gages according to the invention may be used both for quality control of a flat product and for monitoring a process or production line, in which case they are integrated in a system for monitoring or controlling said process.

Gages according to the invention can be employed stationary, in a so-called "lyre" configuration: in this case the surface density or thickness of the flat product is measured in a single region, for example along a strip for a flat product moving continuously in the direction of its length. These gages can be used in a mobile manner, for example moving in translation alternately in one direction and in the other, in a so-called traveling configuration; in this case, the emitter and receiver of the gage move together, always facing each other, on either side of the flat product to be measured. In this case, and for a flat product moving continuously in the direction of its length, its thickness is measured along a zig-zag line.

Figure 10:
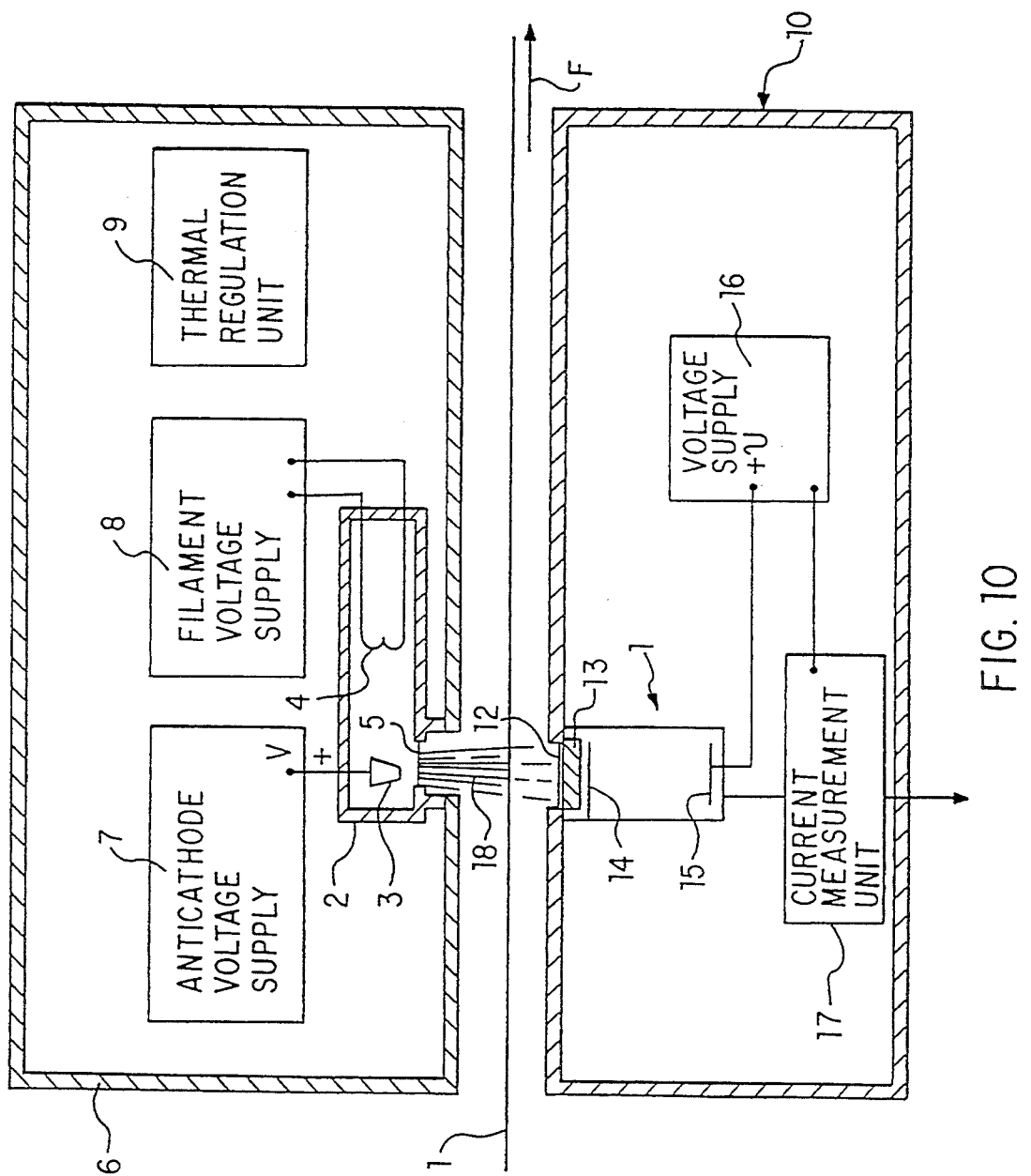
FIG. 10 is a diagram of a thickness gage according to the present invention.

FIG. 10 shows, by way of example, a practical assembly of a gage in accordance with the invention, whose components are situated on either side of the flat material 1 to be monitored, moving in the direction of the arrow F. The X-ray tube has been indicated at 2, with its anticathode 3, its filament 4 constituting the cathode, and its output window 5 directed toward the flat material 1, the tube 2 being placed in a thermally regulated enclosure 6 situated on one side of the flat material 1. The enclosure 6 also contains: a unit 7 supplying the stabilized high voltage V at which the anticathode 3 is held, a unit 8 for supplying the filament 4, and a thermal regulation unit 9. The unit 7 allows adjustment of the voltage V, which is in practice similar to the voltage between the cathode 4 and the anticathode 3 (the voltage of the cathode having a small value).

On the other side of the flat material 1, facing the output window 5 of the tube 2, the receiver assembly 10 is provided, which assembly comprises an X-radiation detector made in the form of a vacuum photodiode 11. In a manner which is known per se, the vacuum photodiode 11 comprises an input window 12, a scintillator crystal 13, converting the received energy into light, a photocathode 14 converting this light into electrons, and an anode 15 collecting the electrons and making it possible to obtain an electrical measurement signal. The receiver assembly 10 further comprises a supply unit 16 for the vacuum photodiode 11, which supplies a voltage +v, and a measurement element 17 for the electric current produced at the output of said photodiode 11. The flux of X-ray photons emitted by the anticathode 3 and directed toward the flat material 1, which partially transmit it, is symbolically represented at 18. The measurement element 17 can give the numerical value of the thickness of the flat material 1 directly.

I claim:

1. A radiometric gage for contactless measurement of the thickness of a flat product comprised of a material having a relatively low atomic number and having a thickness of between approximately 1 and 300 μm, comprising:

an X-radiation emitter having a source comprising an X-radiation tube, said X-radiation tube being situated on one side of the flat product, and directed toward the flat product, an anticathode of the X-radiation tube being made of a material having an atomic number equal to or greater than 50, said material having good thermal conductivity and having a high melting point;

an X-radiation receiver having a detector for receiving X-radiation scattered or transmitted in attenuated form through said flat product, said receiver outputting a measurement signal;

a first member for processing the measurement signal, to obtain information representing the thickness of the flat product; and a second member for adjusting the voltage between a cathode and the anticathode of the X-radiation tube to be within a predetermined range of voltages, to obtain an X-ray emission spectrum essentially limited to continuous bremsstrahlung and having a maximum energy fixed by a value of the voltage between the cathode and the anticathode, the X-radiation having sufficiently low energy to allow the thickness of the flat product to be determined by the gage.

2. The gage as claimed in claim 1, wherein the flat product is comprised of plastic.

3. The gage as claimed in claim 1, wherein the predetermined range of voltages is between approximately 3.5 and 5 kV.

4. A method of measuring the thickness of a flat product comprised of a material having a relatively low atomic number and having a thickness of between approximately 1 and 300 μm, comprising the steps of:

locating an X-radiation emitter having a source comprising an X-radiation tube on a first side of the flat product;

locating an X-radiation receiver having a detector for receiving X-radiation scattered or transmitted in attenuated form through said flat product on a second side of the flat product opposite the first side;

emitting X-radiation with the X-radiation emitter, the X-radiation passing through the flat product and being attenuated or scattered during passage through the flat product;

determining the amount of radiation received at the X-radiation receiver with the X-radiation receiver;

calculating the thickness of the flat product based on the amount of radiation received by the X-radiation receiver, and the type of material comprising the flat product.

5. The method of claim 4, comprising the further step of:

adjusting the voltage between a cathode and an anticathode of the X-radiation emitter to obtain an X-ray emission spectrum essentially limited to continuous bremsstrahlung and having a sufficiently low energy to allow the thickness of the flat product to be determined by the gage.

6. The method of claim 5, wherein the calculation of the thickness of the flat product is further based on the voltage between the cathode and the anticathode of the X-radiation emitter.

7. A radiometric gage for contactless measurement of the thickness of a flat product, comprising:

an X-radiation emitter having a source comprising an X-radiation tube, said X-radiation tube being situated on one side of the flat product, and directed toward the flat product, an anticathode of the X-radiation tube being made of a material having an atomic number equal to or greater than 50, said material having good thermal conductivity and having a high melting point;

an X-radiation receiver having a detector for receiving X-radiation scattered or transmitted in attenuated form through said flat product, said receiver outputting a measurement signal;

a first member for processing the measurement signal, to obtain information representing the thickness of the flat product; and a second member for adjusting the voltage between a cathode and the anticathode of the X-radiation tube to be between approximately 3.7 and 5 kV, to obtain, in conjunction with the anticathode, an X-ray emission spectrum essentially limited to continuous bremsstrahlung having a maximum energy fixed by a value of the voltage between the cathode and the anticathode.

8. The gage as claimed in claim 7, wherein the emitter and receiver are arranged to form an emitter/receiver assembly, the gage further comprising a mechanical support for moving the emitter/receiver assembly with respect to the flat product being measured.

9. The gage as claimed in claim 7, wherein the material of the anticathode is selected from the group consisting of tantalum, tungsten, rhenium, iridium, platinum, and gold.

10. The gage as claimed in claim 7, wherein the anticathode of the X-radiation tube is made of a material having an atomic number greater than 70.

11. The gage as claimed in claim 7, wherein an output window of the X-radiation tube is made of beryllium, said output window having a thickness less than or equal to 400 μm.

12. The gage as claimed in claim 11, wherein an input window of the detector has a soft X-ray attenuation less than or equal to 400 μm of beryllium.

13. A radiometric gage for contactless measurement of thickness of a flat product, comprising:

an X-radiation emitter having a source comprising an X-radiation tube, said X-radiation tube being situated on one side of the flat product, and directed toward the flat product, an anticathode of the X-radiation tube being made of a material having an atomic number equal to or greater than 50, said material having good thermal conductivity and having a high melting point;

an X-radiation receiver having a detector for receiving X-radiation scattered or transmitted in attenuated form through said flat product, said receiver outputting a measurement signal;

a first member for processing the measurement signal, to obtain information representing the thickness of the flat product; and a second member for adjusting the voltage between a cathode and the anticathode of the X-radiation tube to be within a predetermined range of voltages, to obtain, in conjunction with the anticathode, an X-ray emission spectrum essentially limited to continuous bremsstrahlung having a maximum energy fixed by a value of the voltage between the cathode and the anticathode;

wherein the detector is a vacuum photodiode, comprising a scintillator crystal for converting the received energy into light, a photocathode for converting said light into electrons, and a vacuum tube having an anode for collecting said electrons to obtain an electrical measurement signal.

14. The gage as claimed in claim 13, wherein the anticathode of the X-radiation tube is made of a material having an atomic number greater than 70.

15. The gage as claimed in claim 13, wherein the voltage between the cathode and the anticathode is adjustable between approximately 3.7 and 5 kV.

16. The gage as claimed in claim 13, wherein the material of the anticathode is selected from the group consisting of tantalum, tungsten, rhenium, iridium, platinum, and gold.

17. The gage as claime in claim 13, wherein an output window of the X-radiation tube is made of beryllium, said output window having a thickness less than or equal to 400 μm.

18. The gage as claimed in claim 17, wherein an input window of the detector has a soft X-ray attenuation less than or equal to 400 μm of beryllium.

19. The gage as claimed in claim 13, wherein the emitter and receiver are arranged to form an emitter/receiver assembly, the gage further comprising a mechanical support for moving the emitter/receiver assembly with respect to the flat product being measured.

* * * * *